Nov. 14, 1950     E. P. MARSAN     2,530,258
SELF-LOCKING INSULATING BUSHING
FOR ELECTRIC CONDUCTORS
Filed July 23, 1945
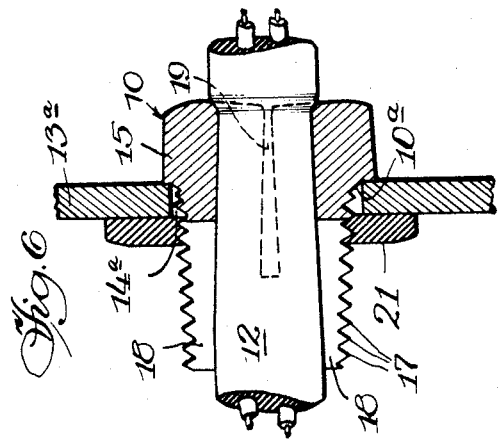
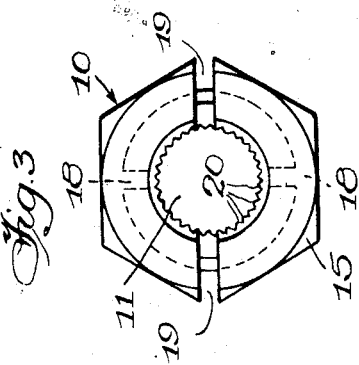
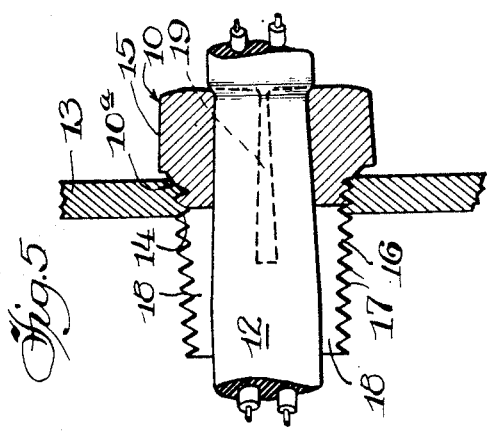
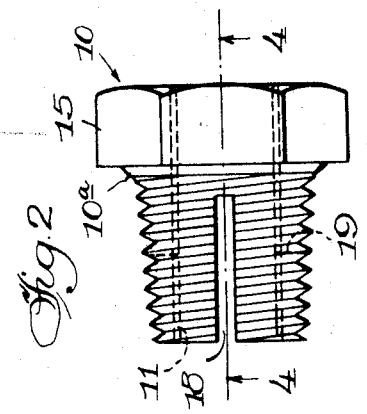
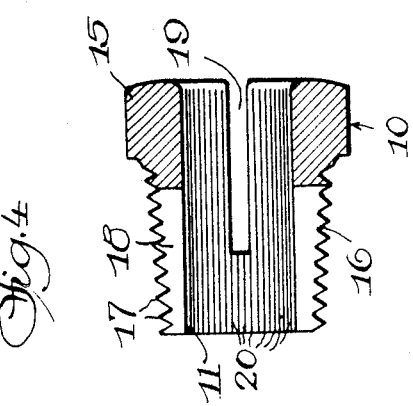
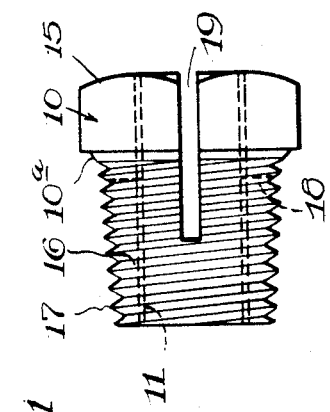
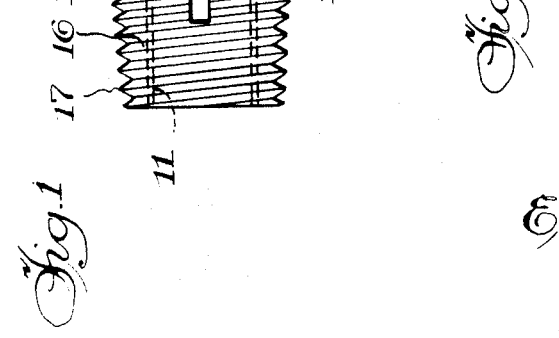
INVENTOR.
Edward P. Marsan
BY
E. K. Lundy
Atty.

Patented Nov. 14, 1950

2,530,258

UNITED STATES PATENT OFFICE 2,530,258

SELF-LOCKING INSULATING BUSHING FOR ELECTRIC CONDUCTORS

Edward P. Marsan, Chicago, Ill., assignor to Frank J. Papes, Chicago, Ill.

Application July 23, 1945, Serial No. 606,606

1 Claim. (Cl. 174—153)

My invention relates generally to bushings of the type which are adapted to be positioned in an aperture through which an electric conductor cord or lead wire passes.

More specifically the present bushing is particularly adapted for use in a lighting fixture, or other electrical appliance, and it is designed so that it will perform the function of an insulator between the electric conductor cord and a metal or other member, and at the same time act as a clamp to firmly hold the conductor cord against movement relative of the wall through which the wires or cord pass.

It is one of the principal objects of this invention to simplify the construction of an insulating bushing such as contemplated herein, and to improve the efficiency, operation and dependability of such bushing.

It is also a principal object of the invention to provide an improved bushing arrangement which is capable of dependably retaining an electric cord or wire in an aperture through which the cord or wire passes and will at the same time provide effective insulation against a short circuiting of the electric current.

Another principal object hereof is to provide a bushing which is capable of performing the dual functions of a retainer and an insulator, and which is of a unitary character, that is, it is made of a single piece of material so there are no parts to become detached and lost or inadvertently loosened. Heretofore, so far as I am aware, clamping bushings have been multiple-part assemblies comprising at least two and frequently several loose parts, and in most of these prior devices it has been necessary to make the several parts separate or detachable in order to assemble them in the form of a complete bushing in the aperture through which the electric cord passes. Such arrangement is inherently objectionable and requires numerous operations in the process of manufacture as well as assembly, and disassembly of the bushing when being installed.

Still another object hereof is to provide a unitary multiple-purpose device which is easy to install without the use of special tools, and is provided with means which are adapted to press into the surface of an electric cord in a manner which will not tend to mar or weaken the surface of said cord.

A further object of the present improvements is to provide a multiple-purpose bushing that is capable of being produced in large quantities in a simple manner, preferably by molding a plastic composition in suitable dies.

It is also an object hereof to provide a self-locking insulating bushing for flexible electric cords such as used in portable lamps, electric irons, and other electric household appliances, as well as commercial appliances using conductor cords leading from service outlets. In this connection, the bushing is such that it is adapted for insertion into apertures made in materials having different thicknesses so that it may be used in lamp bases and other appliances made of wood, cast metal or relatively thin sheet metal, and when so used it is effective to maintain the flexible conductor cord against movement relative to the lamp base or other appliance. Furthermore, the bushing may be effectively used in apertures or bores having either threaded or smooth internal surfaces.

Another novel feature of the present bushing is the provision of a well-defined shoulder, preferably of chamfered or beveled section, at the junction of the head and shank portions, a purpose of said shoulder being to insure a dependable tight fit of the bushing in a threaded or smooth bored hole.

Additional objects, aims and advantages of the invention contemplated herein will be apparent to persons skilled in the art after the construction and operation of the insulating bushing is understood from the within description.

It is preferred to accomplish the numerous objects of this invention and to practice the same in substantially the manner hereinafter fully described and as more particularly pointed out in the appended claim, reference being made to the accompanying drawings that form a part of this specification.

In the drawings:

Fig. 1 is a side elevation of my combined insulating and clamping bushing;

Fig. 2 is a side elevation at a right angle to Fig. 1;

Fig. 3 is an end elevation looking at the head end;

Fig. 4 is a longitudinal section along the plane of line 4—4 on Fig. 2;

Fig. 5 is a sectional view showing the bushing in use in a threaded aperture; and Fig. 6 is a sectional view showing the bushing in use in a smooth aperture.

The drawings are to be understood as being more or less of a schematic character for the purpose of disclosing a typical or preferred form of the improvements contemplated herein, and in these drawings like reference characters identify the same parts in the different views.

The embodiment of my invention shown in the drawing comprises the bushing 10 fabricated from an integral piece of suitable insulating material preferably having a tubular shape with a central longitudinal bore 11. This bore presents a true cylindrical surface having an internal diameter of proper dimension to receive the flexible conductor cord 12 such as commonly used to lead electric current from a service outlet to a suitable household or domestic utility device as, for example, an electric iron, lamp, refrigerator and the like. The parts, identified as 13 in Fig. 5 and 13a in Fig. 6, may be a wall or other portion of the domestic utility device to the interior of which the conductor passes through the threaded aperture 14 of Fig. 5 or the smooth aperture 14a of Fig. 6. The piece of material which constitutes the bushing not only holds the conductor in dependably clamped relationship with respect to the wall 13, but it also effectively insulates the conductor cord 12 from the surrounding surface of the aperture 14 which is usually metal or other conducting material.

As will be seen, the bushing terminates at one end in a head portion 15 which may be angular as shown to receive a wrench or other tool, if desired, for turning it, and the shank portion 16 extending axially beyond the head has a threaded exterior surface 17 diverging or tapering radially inward towards the end of the bushing opposite the head 15. At the junction between head 15 and shank 16 there is a well-defined integral shoulder 10a preferably of chamfered or beveled section, the purpose of which is to insure a dependably tight fit of the bushing in either a threaded aperture 14 or a smooth aperture 14a as will later be explained.

Shank 16 has one or more slits 18, preferably two in number, extending longitudinally thereof from the end opposite the head 15 and terminating in a transverse plane spaced from said head. When the two slits are made they are preferably arranged diametrically opposite each other in radially alined relation. The other end region of the bushing has one or more longitudinal slits 19, preferably two in number, preferably arranged diametrically opposite each other in radially alined relation transversely through said head 15 and extending longitudinally into the adjacent region of shank 16. The inner end regions of the slits 18 and 19 overlap each other as seen in Fig. 4, and the radial plane of slits 18 intersect the radial plane of slits 19 at preferably an angle of ninety degrees (90°) or a right angle.

The bore or cylindrical inner surface of the bushing is preferably roughed in a suitable manner to provide a surface which will effect an engagement with the conductor cord 12 that will prevent slippage. It has been found by experimentation that an ideal surface results from forming a multiplicity of corrugations 20 extending longitudinally of the bore in the manner shown in Figs. 3 and 4.

One manner of assembling the bushing in the aperture 14 is to reeve the conductor 12 through the bushing and then screw the threaded shank portion 16 into the aperture. The varying outside surface of the tapered portion of shank 16 causes the portions between the slits 18 to become distorted by bending radially inward so that they compress or bite into the surface of the conductor in the manner suggested by dotted lines on Fig. 5. The corrugations or ribs 20 assist in this biting action and they also prevent rotative movement of the conductor cord relative to the bushing or wall 13. In the event the bushing is screwed all the way into aperture 14 so that the head 15 abuts the member 13, the head portion will have become distorted between the slits 19 and will bite into or compress the surface of the conductor. When the back of head 15 nears the surface of member 13 the beveled shoulder 10a begins to enter aperture 14 thus exerting additional compressive force on the bushing tending to move the walls of each slit 19 towards each other. By using a suitable tool the head 15 may be turned until the shoulder 10a has become tightly wedged in the hole 14, thereby self-locking the bushing in position. In the event extraneous locking means are desired, a threaded nut 21 may be screwed onto the inwardly protruding portion of shank until said nut frictionally bears against the back surface of the member 13a. It will be apparent that whether the shank is screwed completely into the aperture or only a portion of its length is screwed thereinto, a distortion of the bushing is effected in the regions between the slits 18 or 19 resulting in a compressive force being exerted on the conductor.

In the interest of clearness, the ribs or corrugations 20 are omitted in Figs. 5 and 6 in order to graphically illustrate the distortion inherently present when the bushing is in use.

As before mentioned, the bushing is well adapted for use in a smooth bored aperture 14a such as illustrated in Fig. 6, wherein it will be apparent that after reeving the conductor 12 in the bushing 10 the assembly is inserted in aperture 14a and the tapered shank 16 is forced inward as far as possible. This causes a contraction of the shank and a consequent compressive force on the conductor. If the beveled shoulder 10a is forcibly engaged in the aperture 14a, further compressive action by the bushing is exerted on the conductor to securely maintain the bushing and conductor in frictional assembly in the aperture. It may be desirable to utilize the nut 21 to accomplish the final tightening of the bushing in the aperture and to further assist in distorting the split region of the bushing. In such event the nut could be tightened by a tool until the head is drawn up close to or contacting the outer face of wall 13a. This manner of assembly is effective even though the wall 13a may be of a thin order, such as a sheet metal stamping, spinning, or the like.

While this invention has been described in detail in its present preferred form or embodiment, it will be apparent to persons skilled in the art, after understanding the improvements, that various changes and modifications may be made therein without departing from the spirit or scope thereof. It is aimed in the appended claim to cover all such changes and modifications.

I claim:

A bushing for anchoring a flexible conductor cord in a threaded aperture of an electric appliance to insulate the cord from the aperture wall, said bushing comprising a unitary tubular member of insulating material having an angular head, a shank, and a cylindrical bore in said head and shank of approximately uniform diameter throughout its length, said shank being exteriorly tapered and threaded throughout its tapered portion for wedging coaction with the wall of the aperture; one end region of said member having a pair of opposite longitudinal slots dividing the head and the proximate shank portion into opposing spaced semi-cylindrical sections; the other end of said member having a pair of opposite longitudinal slots dividing the adjacent portion of said shank into opposing spaced semi-cylindrical sections; the slots of one pair overlapping the slots of the other pair at the mid-region of said member; wedging coaction between said tapered shank and said aperture providing the sole anchorage means for said bushing, and also defining the sole means for distorting said bore in a radially inward direction thereby to constrict the cord and restrain the same against movement relative to said bushing.

EDWARD P. MARSAN.

REFERENCES CITED

The following references are of record in the file of this patent:

UNITED STATES PATENTS

| Number | Name | Date |
|---|---|---|
| 846,158 | Stewart | Mar. 5, 1907 |
| 885,017 | Cassidy | Apr. 21, 1908 |
| 960,889 | Garrett | June 7, 1910 |
| 1,131,399 | McGinley | Mar. 9, 1915 |
| 2,026,954 | Dusen | Jan. 7, 1936 |
| 2,032,416 | Hunt | Mar. 3, 1936 |
| 2,087,384 | Lee | July 20, 1937 |
| 2,250,685 | Tiefenbacher et al. | July 29, 1941 |
| 2,308,641 | Brushaber et al. | Jan. 19, 1943 |
| 2,420,826 | Irrgang | May 20, 1947 |

FOREIGN PATENTS

| Number | Country | Date |
|---|---|---|
| 9,964 | Switzerland | May 18, 1895 |
| 319,905 | England | Oct. 3, 1929 |